United States Patent
Yonemoto et al.

(10) Patent No.: US 10,472,492 B2
(45) Date of Patent: Nov. 12, 2019

(54) ADDITIVE COMPOSITION FOR SILICA COMPOUND RUBBER COMPOSITION, RUBBER COMPOSITION AND TIRE

(71) Applicants: BRIDGESTONE CORPORATION, Tokyo (JP); KAO CORPORATION, Tokyo (JP)

(72) Inventors: Makiko Yonemoto, Higashiyamoto (JP); Tetsuo Takano, Wakayama (JP); Motoi Konishi, Wakayama (JP)

(73) Assignees: BRIDGESTONE CORPORATION, Chuo-ku, Tokyo (JP); KAO CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/551,370

(22) PCT Filed: Feb. 22, 2016

(86) PCT No.: PCT/JP2016/000935
§ 371 (c)(1),
(2) Date: Aug. 16, 2017

(87) PCT Pub. No.: WO2016/139916
PCT Pub. Date: Sep. 9, 2016

(65) Prior Publication Data
US 2018/0030241 A1 Feb. 1, 2018

(30) Foreign Application Priority Data
Mar. 5, 2015 (JP) .................................. 2015-044067

(51) Int. Cl.
| C08K 5/103 | (2006.01) |
| B60C 1/00 | (2006.01) |
| C08K 3/36 | (2006.01) |
| C08L 9/00 | (2006.01) |
| C08L 21/00 | (2006.01) |
| C08L 9/06 | (2006.01) |
| C08K 5/101 | (2006.01) |

(52) U.S. Cl.
CPC ............... C08K 5/103 (2013.01); B60C 1/00 (2013.01); B60C 1/0016 (2013.01); C08K 3/36 (2013.01); C08K 5/101 (2013.01); C08L 9/00 (2013.01); C08L 9/06 (2013.01); C08L 21/00 (2013.01)

(58) Field of Classification Search
CPC .......... C08K 5/103; C08K 3/36; C08K 5/101; B60C 1/0016; C08L 9/06

USPC .......................................................... 524/317
See application file for complete search history.

(56) References Cited

U.S. PATENT DOCUMENTS

| 5,717,022 A * | 2/1998 | Beckmann | ............ B60C 1/0016 152/450 |
| 2014/0135437 A1 | 5/2014 | Sandstrom et al. | |
| 2017/0051134 A1 | 2/2017 | Yamagishi | |

FOREIGN PATENT DOCUMENTS

| CN | 103450504 A | 12/2013 |
| CN | 103819768 A | 5/2014 |
| CN | 106459499 A | 2/2017 |
| EP | 2 937 384 A1 | 10/2015 |
| JP | 62-032836 A | 2/1987 |
| JP | 62-62836 A | 3/1987 |
| JP | 09-118786 A | 5/1997 |
| JP | 2009-504810 A | 2/2009 |
| JP | 2005-534759 A | 11/2015 |
| WO | 2014/098155 A1 | 6/2014 |
| WO | 2015/147274 A1 | 10/2015 |

OTHER PUBLICATIONS

Communication dated Feb. 6, 2018, from European Patent Office in counterpart application No. 16758615.5.
International Search Report for PCT/JP2016/000935 dated May 24, 2016.
"Green Plasticizer", Science and Technical Documentation Press, Oct. 2011, ISBN 978 7-5023-6858-6, p. 201 (total 7 pages).
Communication dated May 7, 2019 in CN Application No. 201680013906.4.

* cited by examiner

Primary Examiner — Hui H Chin
(74) Attorney, Agent, or Firm — Sughrue Mion, PLLC

(57) ABSTRACT

As an additive composition capable of improving the processability, the low loss property and the breaking resistance of a silica compounded rubber composition, and a rubber composition excellent in processability, low loss property and breaking resistance, this disclosure provides an additive composition for silica compounded rubber composition comprising a glycerin fatty acid ester, wherein: the glycerin fatty acid ester is an ester of a glycerin and two or more fatty acids, a fatty acid component which is the most among the two or more fatty acids constituting the glycerin fatty acid ester being 10 to 90 mass % of all fatty acids; and a monoester component is contained in an amount of 50 to 100 mass % in the glycerin fatty acid ester, and provides a rubber composition comprising a diene based rubber, a silica, and the additive composition for silica compounded rubber composition.

15 Claims, No Drawings

ADDITIVE COMPOSITION FOR SILICA COMPOUND RUBBER COMPOSITION, RUBBER COMPOSITION AND TIRE

CROSS REFERENCE TO RELATED APPLICATIONS

This application is a National Stage of International Application No. PCT/JP2016/000935 filed Feb. 22, 2016, claiming priority based on Japanese Patent Application No. 2015-044067 filed Mar. 5, 2015, the contents of all of which are incorporated herein by reference in their entirety.

TECHNICAL FIELD

This disclosure relates to an additive composition for silica compounded rubber composition, a rubber composition and a tire.

BACKGROUND

Recently, relating to the currency of global carbon dioxide emission limits accompanying increased concerns with environment problem, requirement for fuel consumption reduction of automobiles is increasing. In order to satisfy such requirement, with respect to tire performances, reduction of rolling resistance is desired as well. Simultaneously, requirement for safety has increased as well, and achievement of both rolling resistance and safety (in particular, gripping performance on wet road surface) of tire is strongly desired.

In such background, there is a tendency of increase of compounding silica to rubber composition. A rubber composition with a silica compounded has small hysteresis loss (i.e., excellent low loss property), and it is possible to reduce rolling resistance of a tire by applying a rubber composition with small hysteresis loss to the tire. Moreover, by applying a rubber composition with a silica compounded to a tread rubber of a tire, it is possible to improve the gripping performance on wet road surface of the tire. However, silica aggregates in the rubber composition, and thus there is a problem of processability (operability).

Regarding this, as a chemical for improving the dispersibility of silica in rubber composition and improving the processability, a glycerin fatty acid ester as described in WO 2014/098155 A1 (PTL1), etc. has been developed.

CITATION LIST

Patent Literature

[PTL 1] WO 2014/098155 A1

SUMMARY

Technical Problem

However, in order to not only further improve the processability of the rubber composition, but also reduce the rolling resistance and improve the breaking resistance of the tire, improvement of the low loss property (low tan δ) and the breaking resistance is desired in rubber compositions used in tires. According to our further study, it was understood that there is still room for improving the low loss property and the breaking resistance in the technique as described in PTL1.

Then, this disclosure aims to solve the aforementioned problem of the prior art, and aims to provide an additive composition capable of improving the processability, the low loss property and the breaking resistance of a silica compounded rubber composition, and to provide a rubber composition excellent in processability, low loss property and breaking resistance.

Moreover, this disclosure aims to further provide a tire with small rolling resistance, and excellent breaking resistance.

Solution to Problem

The summary and construction of the additive composition for silica compounded rubber composition, the rubber composition and the tire of this disclosure for solving the aforementioned problem is as follows.

The additive composition for silica compounded rubber composition of this disclosure comprises a glycerin fatty acid ester, wherein: the glycerin fatty acid ester is an ester of a glycerin and two or more fatty acids, a fatty acid component which is the most among the two or more fatty acids constituting the glycerin fatty acid ester being 10 to 90 mass % of all fatty acids; and a monoester component is contained in an amount of 50 to 100 mass % in the glycerin fatty acid ester. By compounding the additive composition of this disclosure to a silica compounded rubber composition, it is possible to improve the processability, the low loss property and the breaking resistance of the silica compounded rubber composition.

Here, regarding the fatty acid components, fatty acids with identical number of alkyl carbon atoms and their configuration and bonding state, i.e., stereoisomers, are considered as one component. For example, even fatty acids with the same number of carbon atoms of 18, n-1-octadecanoic acid (ordinary straight chain stearic acid), 2-octyl-1-decanoic acid (stearic acid having a branch at the 2-position), cis-9-octadecenoic acid (ordinary oleic acid), cis,cis-9,12-octadecadienoic acid (ordinary linoleic acid), etc. are considered as different components.

Moreover, although the mass ratio of the two or more fatty acids is that the most fatty acid component is 10 to 90 mass % in all the fatty acids, from the viewpoint of further improving the processability, the low loss property and the breaking resistance of the rubber composition, 15 to 80 mass % is preferable, 20 to 70 mass % is more preferable, and 30 to 60 mass % is further more preferable. In this case, it is possible to further improve the processability, the low loss property and the breaking resistance of the silica compounded rubber composition.

In the additive composition for silica compounded rubber composition of this disclosure, the fatty acids constituting the glycerin fatty acid ester preferably have 8 to 22 carbon atoms, more preferably 12 to 18 carbon atoms, further more preferably 14 to 18 carbon atoms. By compounding an additive composition containing a glycerin fatty acid ester with fatty acids with 8 to 22 carbon atoms as constituent fatty acids to a silica compounded rubber composition, it is possible to balance the processability, the low loss property and the breaking resistance of the silica compounded rubber composition at a high level.

In the additive composition for silica compounded rubber composition of this disclosure, among the two or more fatty acids constituting the glycerin fatty acid ester, it is preferable that one among the most fatty acid component and a second most fatty acid component is a fatty acid with 16 carbon atoms, and the other is a fatty acid with 18 carbon atoms. In this case, it is possible to further improve the processability, the low loss property and the breaking resistance of the silica compounded rubber composition.

Here, a mass ratio of the fatty acid with 16 carbon atoms and the fatty acid with 18 carbon atoms is preferably 90/10 to 10/90, more preferably 80/20 to 20/80, further more preferably 75/25 to 25/75. In this case, it is possible to further improve the processability, the low loss property and the breaking resistance of the silica compounded rubber composition.

In the additive composition for silica compounded rubber composition of this disclosure, a monoester component is contained in the glycerin fatty acid ester in an amount of 50 to 100 mass %, preferably 60 to 99 mass %, and more preferably 85 to 98 mass %. In this case, it is possible to further improve the processability, the low loss property and the breaking resistance of the silica compounded rubber composition, which is preferable from the viewpoint of production.

The glycerin fatty acid ester may be obtained with any one among the methods of: performing esterification reaction with a glycerin and fatty acids; hydrolyzing a glycerin fatty acid triester such as natural fat and oil; performing transesterification with a glycerin fatty acid triester such as natural fat and oil, and fatty acids, etc. The method for obtaining the glycerin fatty acid ester is not specifically limited, and well known methods may be used. From the viewpoint of the productivity, it is preferable to use the method of performing esterification reaction with a glycerin and fatty acids.

The material of the fatty acids may be those obtained by hydrolyzing fats and oils, such as plant fats and oils, and animal fats and oils, or obtained by hydrogenating or dehydrogenating these fats and oils or hydrolyzed fatty acids. Moreover, the material of the fats and oils is not specifically limited, and may be plant fats and oils, and animal fats and oils. Specifically, palm oil, soybean oil, olive oil, cottonseed oil, coconut oil, palm kernel oil, beef tallow, lard, fish oil, etc. may be used.

In this disclosure (inclusive of the production examples, examples, etc. mentioned below), the contents (mass %) of the glycerin fatty acid monoester, diester and triester in the glycerin fatty acid ester were measured according to the method as described in WO 2014/098155 A1 (PTL1). Moreover, the contents (mass %) of the fatty acid components were measured by performing saponification and methyl esterification to the glycerin fatty acid monoester according to standard methods for the analysis of fats, oils and related materials established by Japan Oil Chemists' Society, via GPC analysis.

The rubber composition of this disclosure comprises a diene based rubber, a silica, and the additive composition for silica compounded rubber composition. The rubber composition of this disclosure is excellent in processability, low loss property and breaking resistance.

In a favorable example for the rubber composition of this disclosure, a compounding amount of the additive composition for silica compounded rubber composition is preferably 0.5 to 20 parts by mass per 100 parts by mass of the silica. In this case, it is possible to sufficiently improve the processability, the low loss property and the breaking resistance of the rubber composition.

In the rubber composition of this disclosure, it is preferable that the silica is contained in an amount of 10 to 120 parts by mass per 100 parts by mass of the diene based rubber. In this case, it is possible to sufficiently improve the processability, the low loss property and the breaking resistance of the rubber composition.

In another favorable example for the rubber composition of this disclosure, the diene based rubber contains a styrene-butadiene copolymer rubber. In this case, it is possible to sufficiently improve the processability, the low loss property and the breaking resistance of the rubber composition.

The tire of this disclosure uses the aforementioned rubber composition. The tire of this disclosure uses the rubber composition, and thus has small rolling resistance, and excellent breaking resistance.

Advantageous Effect

According to this disclosure, it is possible to provide an additive composition capable of improving the processability, the low loss property and the breaking resistance of a silica compounded rubber composition. Moreover, according to this disclosure, it is possible to provide a rubber composition excellent in processability, low loss property and breaking resistance. Moreover, according to this disclosure, it is possible to further provide a tire with small rolling resistance, and excellent breaking resistance.

DETAILED DESCRIPTION

<Additive Composition for Silica Compounded Rubber Composition>

Hereinafter, the additive composition for silica compounded rubber composition of this disclosure is described in details based on its embodiment.

The additive composition for silica compounded rubber composition of this disclosure contains a glycerin fatty acid ester, where the glycerin fatty acid ester is an ester of a glycerin and two or more fatty acids, the most fatty acid component among the two or more fatty acids constituting the glycerin fatty acid ester being 10 to 90 mass % of all fatty acids; and further a monoester component is contained in an amount of 50 to 100 mass % with respect to the glycerin fatty acid ester.

The glycerin fatty acid ester constituting the additive composition for silica compounded rubber composition of this disclosure is an ester of a glycerin and two or more fatty acids. Here, the glycerin fatty acid ester refers to a compound formed via an ester bond between at least one of 3 OH groups of the glycerin and a COOH group of the fatty acids.

Here, the glycerin fatty acid ester may be any one of: a glycerin fatty acid monoester formed via esterification of one glycerin molecule and one fatty acid molecule (monoester component); a glycerin fatty acid diester formed via esterification of one glycerin molecule and two fatty acid molecules (diester component); a glycerin fatty acid triester formed via esterification of one glycerin molecule and three fatty acid molecules (triester component); and a mixture of these, while glycerin fatty acid monoester is preferable. Here, if the glycerin fatty acid ester is a mixture of a glycerin fatty acid monoester, a glycerin fatty acid diester and a glycerin fatty acid triester, the content of each ester may be measured with gel permeation chromatography (GPC). Moreover, the two fatty acids constituting the glycerin fatty acid diester and the three fatty acids constituting the glycerin fatty acid triester may be either identical or different.

The glycerin fatty acid ester constituting the additive composition for silica compounded rubber composition of this disclosure is an ester of a glycerin and two or more fatty acids, and may be a glycerin fatty acid diester or a glycerin fatty acid triester formed via esterification of two or more fatty acids and one glycerin molecule, but is preferably a mixture of a glycerin fatty acid monoester formed via esterification of one glycerin molecule and one type of fatty acid molecule among the aforementioned two or more fatty acids, and a glycerin fatty acid monoester formed via esterification of one glycerin molecule and another type of fatty acid.

From the viewpoint of the processability, the low loss property and the breaking resistance of the rubber composition, the two or more fatty acids as materials of the glycerin fatty acid ester (i.e., constituent fatty acids of the glycerin fatty acid ester) are preferably C8 to C22 fatty acids, more preferably C12 to C18 fatty acids, further more preferably C14 to C18 fatty acids, and even further more preferably C16 fatty acids and C18 fatty acids. Moreover, among the two or more fatty acids as materials of the glycerin fatty acid ester, it is specifically preferable that among the most fatty acid component and the second most fatty acid component, one is a C16 fatty acid, and the other is a C18 fatty acid.

If the glycerin fatty acid ester is an ester of a glycerin, a C16 fatty acid and a C18 fatty acid, a mass ratio of the C16 fatty acid and the C18 fatty acid (C16 fatty acid/C18 fatty acid) is preferably within a range of 90/10 to 10/90, more preferably a range of 80/20 to 20/80, further more preferably 75/25 to 25/75. If the mass ratio of the C16 fatty acid and the C18 fatty acid is within this range, it is possible to further improve the processability, the low loss property and the breaking resistance of the rubber composition.

The constituent fatty acids of the glycerin fatty acid ester may be either straight chain or branched, but is preferably straight chain. Moreover, it may be either saturated fatty acid or unsaturated fatty acid, but is preferably saturated fatty acid.

The constituent fatty acids of the glycerin fatty acid ester are specifically exemplified as caprylic acid, pelargonic acid, capric acid, lauric acid, myristic acid, palmitic acid, stearic acid, isostearic acid, oleic acid, linoleic acid, linolenic acid, arachic acid, arachidonic acid, behenic acid, etc., and among these, lauric acid, myristic acid, palmitic acid and stearic acid are preferably, and palmitic acid and stearic acid are more preferable.

Specifically, the glycerin fatty acid ester is preferably monoglyceride laurate, monoglyceride myristate, monoglyceride palmitate and monoglyceride stearate, more preferably monoglyceride palmitate and monoglyceride stearate.

<Rubber Composition>

Hereinafter, the rubber composition of this disclosure is described in details based on its embodiment.

The rubber composition of this disclosure contains a diene based rubber, a silica and the additive composition for silica compounded rubber composition, in the rubber composition of this disclosure, the glycerin fatty acid ester, which is an ester of a glycerin and two or more fatty acids constituting the additive composition for silica compounded rubber composition, improves the dispersibility of the silica in the rubber composition, and thus is excellent in processability. Moreover, since the dispersibility of the silica in the rubber composition is high, the compounding effect of the silica is sufficiently exhibited, and the low loss property and the breaking resistance are excellent as well.

The diene based rubber used in the rubber composition of this disclosure is exemplified as natural rubber (NR) and synthetic diene based rubber, and the synthetic diene based rubber is specifically exemplified as polybutadiene rubber (BR), synthetic polyisoprene rubber (IR), styrene-butadiene copolymer rubber (SBR), styrene-isoprene copolymer rubber (SIR), etc. Here, the diene based rubber preferably contains a styrene-butadiene copolymer rubber. These diene based rubbers may be used singly or as a blend of two or more. Moreover, the used diene based rubber may be either modified or unmodified.

The silica used in the rubber composition of this disclosure is not specifically limited, and is exemplified as wet silica (hydrous silicic acid), dry silica (anhydrous silicic acid), calcium silicate, aluminum silicate, etc. Among these, wet silica is preferable. These silicas may be used singly or in a combination of two or more. Moreover, a BET specific surface area of the silica (measured according to ISO 5794/1) is preferably within a range of 40 to 350 $m^2$/g, more preferably a range of 80 to 350 $m^2$/g, further more preferably a range of 120 to 350 $m^2$/g. A silica within this range of BET specific surface area has the advantage of the capability of achieving both the rubber reinforcement performance and the dispersibility in the diene based rubber. Such silica may be commercially available ones, such as trade names "Nipsil AQ" (BET specific surface area=205 $m^2$/g), "Nipsil KQ", made by Tosoh Silica Corporation, and trade name "Ultrasil VN3" (BET specific surface area=175 $m^2$/g), made by Degussa AG, and the like.

From the viewpoint of improving the low loss property and the breaking resistance, a compounding amount of the silica is preferably 5 parts by mass or more, more preferably 10 parts by mass or more, further more preferably 20 parts by mass or more, even further more preferably 40 parts by mass or more per 100 parts by mass of the diene based rubber; and from the viewpoint of improving the processability, is preferably 200 parts by mass or less, more preferably 150 parts by mass or less, further more preferably 120 parts by mass or less per 100 parts by mass of the diene based rubber. The compounding amount of the silica is specifically preferably within a range of 10 to 120 parts by mass per 100 parts by mass of the diene based rubber.

In the rubber composition of this disclosure, from the viewpoint of the processability of the rubber composition, a compounding amount of the additive composition for silica compounded rubber composition is preferably 0.5 parts by mass or more, more preferably 1 part by mass or more, further more preferably 1.5 parts by mass or more per 100 parts by mass of the silica; and from the viewpoint of the breaking resistance of the rubber composition, is preferably 20 parts by mass or less, more preferably 10 parts by mass or less, further more preferably 5 parts by mass or less per 100 parts by mass of the silica.

From the viewpoint of the processability of the rubber composition, the compounding amount of the additive composition for silica compounded rubber composition is preferably 0.5 parts by mass or more, more preferably 1 part by mass or more, further more preferably 1.5 parts by mass or more per 100 parts by mass of the diene based rubber; and from the viewpoint of the breaking resistance of the rubber composition, is preferably 10 parts by mass or less, more preferably 5 parts by mass or less, further more preferably 3 parts by mass or less per 100 parts by mass of the diene based rubber.

In order to improve the compounding effect of the silica, it is preferable that the rubber composition of this disclosure further contains a silane coupling agent. The silane coupling agent is not specifically limited, and is exemplified as bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyethyl-N,N-dimethylthiocarbamoyl tetrasulfide, 3-trimethoxysilylpropylbenzothiazolyl tetrasulfide, 3-triethoxysilylpropylbenzothiazolyl tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, etc. These silane coupling agents may be used singly or in a combination of two or more. Moreover, from the viewpoint of improving the dispersibility of the silica, a compounding amount of the silane coupling agent is preferably 1 part by mass or more, more preferably 4 parts by mass or more, and is preferably 20 parts by mass or less, more preferably 12 parts by mass or less per 100 parts by mass of the silica.

From the viewpoint of the breaking resistance of the rubber composition, the rubber composition of this disclosure preferably further contains a carbon black. The carbon black is not specifically limited, and is exemplified as carbon blacks of GPF, FEF, HAF, ISAF, SAF grade. These carbon blacks may be used singly or in a combination of two or more. Moreover, the compounding amount of the carbon black is preferably within a range of 1 to 30 parts by mass, more preferably a range of 5 to 20 parts by mass per 100 parts by mass of the diene based rubber.

In the rubber composition of this disclosure, other than the diene based rubber, the silica, the additive composition for silica compounded rubber composition, the silane coupling agent and the carbon black, it is possible to appropriately compound compounding agents ordinarily used in rubber industry, e.g., vulcanizing agents such as sulfur and the like, vulcanization accelerator, softener, stearic acid, antioxidant, etc. as long as not inhibiting the purpose of this disclosure. These compounding agents are favorably commercially available ones.

Starting with the tire mentioned below, the rubber composition of this disclosure may be used in various rubber products such as anti-vibration rubber, belt, hose and the like.

<Tire>

The tire of this disclosure uses the aforementioned rubber composition. The tire of this disclosure uses the rubber composition, and thus has small rolling resistance, and excellent breaking resistance. Here, the portions of tire to use the rubber composition for tire is exemplified as tread, sidewall, case member, etc.

Depending on the type of the applied tire, the tire of this disclosure may be obtained via vulcanization after molding by using an unvulcanized rubber composition, or molding by using a half-crosslinked rubber composition (half-vulcanized rubber) subjected to prevulcanization, etc., and then performing regular vulcanization. Here, the tire of this disclosure is preferably a pneumatic tire, and the gas filled in the pneumatic tire may be ordinary air, air with adjusted oxygen partial pressure, or inactive gases such as nitrogen, argon, helium and the like.

EXAMPLES

This disclosure will be explained in further detail below according to examples, while this disclosure is not limited to the examples below.

<Preparation and Evaluation of Rubber Composition>

According to the formulation as shown in Tables 1 and 2, by using an ordinary Banbury mixer, and kneading in the order of a first kneading process and a second kneading process, the rubber composition was prepared. Here, the maximum temperature of the rubber composition in the first kneading process was set to 150° C., and the maximum temperature of the rubber composition in the second kneading process was set to 110° C. With respect to the obtained rubber composition, the breaking resistance, the low loss property, the pane effect and the processability were evaluated according to the following methods.

(1) Breaking Resistance

The obtained rubber compositions were subjected to 20 minutes of vulcanization at 160° C., and then tensile test was performed at room temperature (23° C.) according to JIS K6251, to measure their EB (elongation at break (%)), TB (tensile strength (MPa)) and TF (toughness: EB×TB), which were represented with indexes with Comparative Example 2 as 100 in Table 1, and represented with indexes with Comparative Example 4 as 100 in Table 2. A larger index value shows larger tensile strength, or higher rubber strength (toughness).

(2) Low Loss Property (2-1) The obtained rubber compositions were subjected to 20 minutes of vulcanization at 160° C., and their tan δ was measured by using a viscoelasticity measurement apparatus (made by Rheometrics Inc.) at a temperature of 60° C., a dynamic strain of 5% and a frequency of 15 Hz, which was represented with an index of its reciprocal, with the tan δ of Comparative Example 2 as 100 in Table 1. A larger index value shows smaller tan δ and better low loss property.

(2-2) The obtain rubber compositions were subjected to 20 minutes of vulcanization at 160° C., made into No. 3 dumbbell specimens according to JIS K6251, and then, by using a fatigue and durability tester (Servopulser EMT, made by Shimadzu Corporation), adjusting the temperature to 50° C., exerting a testing force of a minimum 10 N to a maximum 20 N in a cycle of 10 Hz, the tan δ at 7000 times of exertion was measured, and represented with an index of its reciprocal, with the tan δ of Comparative Example 4 as 100 in Table 2. A larger index value shows smaller tan S and better low loss property.

(3) Processability

The pre-vulcanization viscosity and scorch time of the obtained rubber composition were measured according to JIS K 6300-1:2001 (Mooney viscosity, scorch time). The pre-vulcanization viscosity (Mooney viscosity) was represented with an index of its reciprocal with Comparative Example 2 as 100 in Table 1, and was represented with an index of its reciprocal with Comparative Example 4 as 100 in Table 2. The scorch time was represented with an index with Comparative Example 2 as 100 in Table 1, and was represented with an index with Comparative Example 4 as 100 in Table 2. Regarding the pre-vulcanization viscosity, a larger index value shows lower pre-vulcanization viscosity and better processability (operability), and regarding the scorch time, a larger index value shows longer scorch time and better processability (operability).

TABLE 1

| | | | | Comparative Example 1 | Comparative Example 2 | Comparative Example 3 | Example 1 |
|---|---|---|---|---|---|---|---|
| Formulation | First kneading process | SBR-1 *1 | Parts by mass | 70 | 70 | 70 | 70 |
| | | BR *2 | | 30 | 30 | 30 | 30 |
| | | Aromatic oil *3 | | 6 | 6 | 6 | 6 |
| | | Carbon black *4 | | 10 | 10 | 10 | 10 |
| | | Silica *5 | | 60 | 60 | 60 | 60 |
| | | Silane coupling agent *6 | | 5 | 5 | 5 | 5 |
| | | Glycerin fatty acid ester A *7 | | — | 2 | — | — |
| | | Glycerin fatty acid ester B *8 | | — | — | 2 | — |
| | | Glycerin fatty acid ester C *9 | | — | — | — | 2 |
| | | Antioxidant 6C *10 | | 1.5 | 1.5 | 1.5 | 1.5 |
| | Second kneading process | Zinc oxide | | 1.5 | 1.5 | 1.5 | 1.5 |
| | | Stearic acid | | 1.5 | 1.5 | 1.5 | 1.5 |
| | | Vulcanization accelerator DPG *11 | | 0.90 | 0.90 | 0.90 | 0.90 |
| | | Vulcanization accelerator DM *12 | | 1.20 | 1.20 | 1.20 | 1.20 |
| | | Vulcanization accelerator Z *13 | | 1.50 | 1.50 | 1.50 | 1.50 |
| | | Sulfur | | 2.0 | 2.0 | 2.0 | 2.0 |
| Additive composition | Constituent fatty acid composition | Palmitic acid | Mass % | — | 99 | 99 | 42 |
| | | Stearic acid | | — | 0.2 | 0.2 | 54 |
| | | Others | | — | 0.8 | 0.8 | 4 |
| | Monoester component content | | Mass % | — | 64 | 97 | 97 |
| Physical properties | Breaking resistance (tensile properties) | TB | index | 102 | 100 | 88 | 104 |
| | | TF | | 100 | 100 | 81 | 106 |
| | Viscoelasticity | Tan δ (low loss property) at 60° C. | | 102 | 100 | 105 | 105 |
| | Processability | Pre-vulcanization viscosity | | 89 | 100 | 102 | 99 |
| | | Scorch time | | 106 | 100 | 101 | 107 |

TABLE 2

| | | | | Comparative Example 4 | Comparative Example 5 | Comparative Example 6 | Comparative Example 7 | Example 2 | Example 3 | Example 4 |
|---|---|---|---|---|---|---|---|---|---|---|
| Formulation | First kneading process | SBR-2 *14 | Parts by mass | 100 | 100 | 100 | 100 | 100 | 100 | 100 |
| | | Carbon black *4 | | 5 | 5 | 5 | 5 | 5 | 5 | 5 |
| | | Silica *5 | | 55 | 55 | 55 | 55 | 55 | 55 | 55 |
| | | Silane coupling agent *6 | | 5.5 | 5.5 | 5.5 | 5.5 | 5.5 | 5.5 | 5.5 |
| | | Stearic acid | | 2 | 2 | 2 | 2 | 2 | 2 | 2 |
| | | Glycerin fatty acid ester A *7 | | — | 3 | — | — | — | — | — |
| | | Glycerin fatty acid ester B *8 | | — | — | 3 | — | — | 1.5 | — |
| | | Glycerin fatty acid ester C *9 | | — | — | — | — | 3 | 1.5 | — |
| | | Glycerin fatty acid ester D *15 | | — | — | — | 3 | — | — | — |
| | | Glycerin fatty acid ester E *16 | | — | — | — | — | — | — | 3 |
| | Second kneading process | Zinc oxide | | 3 | 3 | 3 | 3 | 3 | 3 | 3 |
| | | Vulcanization accelerator DPG *11 | | 1 | 1 | 1 | 1 | 1 | 1 | 1 |
| | | Vulcanization accelerator DM *12 | | 1 | 1 | 1 | 1 | 1 | 1 | 1 |
| | | Vulcanization accelerator TBBS *17 | | 0.5 | 0.5 | 0.5 | 0.5 | 0.5 | 0.5 | 0.5 |
| | | Sulfur | | 1.5 | 1.5 | 1.5 | 1.5 | 1.5 | 1.5 | 1.5 |
| Additive composition | Constituent fatty acid composition | Palmitic acid | Mass % | — | 99 | 99 | 2 | 42 | 71 | 28 |
| | | Stearic acid | | — | 0.2 | 0.2 | 97 | 54 | 27 | 65 |
| | | Others | | — | 0.8 | 0.8 | 1 | 4 | 2 | 7 |
| | Monoester component content | | Mass % | — | 64 | 97 | 61 | 97 | 97 | 56 |
| Physical properties | Breaking resistance (tensile properties) | TB | Index | 100 | 102 | 102 | 98 | 106 | 103 | 103 |
| | | TF | | 100 | 109 | 111 | 116 | 123 | 120 | 123 |
| | Viscoelasticity | Tan δ (low loss property) at 50° C. | | 100 | 111 | 113 | 105 | 163 | 136 | 137 |
| | Processability | Pre-vulcanization viscosity | | 100 | 88 | 94 | 102 | 123 | 106 | 115 |
| | | Scorch time | | 100 | 88 | 94 | 102 | 123 | 106 | 115 |

1 SBR-1: styrene-butadiene copolymer rubber, emulsion polymerization SBR, trade name "JSR 1500", made by JSR Corporation 2 BR: polybutadiene rubber, solution polymerization BR, trade name "JSR BR01", made by JSR Corporation 3 Aromatic oil: trade name "Aromax #3", made by Fuji Kosan Co., Ltd 4 Carbon black: trade name "Diablack N234", ISAF-HS, made by Mitsubishi Chemical 5 Silica: trade name "Nipsil AQ", made by Tosoh Silica Corporation 6 Silane coupling agent: trade name "Si69", made by Degussa AG 7 Glycerin fatty acid ester A: the glycerin fatty acid ester synthesized according to the method of Production Example 4 and used in Example 4 of WO 2014/098155 A1 (PTL1), glycerin fatty acid monoester content=64 mass %, glycerin fatty acid diester content=34 mass %, glycerin fatty acid triester content=1 mass %, glycerin content=1 mass %, and the constituent fatty acids contain 99 mass % of palmitic acid and 1 mass % of other fatty acids 8 Glycerin fatty acid ester B: prepared via molecular distillation of the aforementioned glycerin fatty acid ester A, glycerin fatty acid monoester content=97 mass %, and the constituent fatty acids contain 99 mass % of palmitic acid and 1 mass % of other fatty acids
9 Glycerin fatty acid ester C: prepared by synthesizing a glycerin fatty acid ester according to the method of Production Example 1 of WO 2014/098155 A1 (PTL1) except that palm derived hydrogenated fatty acids with the same molar amount are used as fatty acids instead of octanoic acids, and further performing molecular distillation, glycerin fatty acid monoester content=97 mass %, and the constituent fatty acids contain 54 mass % of stearic acid, 42 mass % of palmitic acid, and 4 mass % of other fatty acids
10 Antioxidant 6C: N-(1,3-dimethylbutyl)-N'-phenyl-p-phenylenediamine, trade name "Nocrac 6C", made by Ouchi Shinko Chemical Industrial Co., Ltd.
11 Vulcanization accelerator DPG: 1,3-diphenylguanidine, trade name "Nocceler D", made by Ouchi Shinko Chemical industrial Co., Ltd.
12 Vulcanization accelerator DM: di-2-benzothiazolyl disulfide, trade name "Nocceler DM", made by Ouchi Shinko Chemical Industrial Co., Ltd
13 Vulcanization accelerator CZ: N-cyclohexyl-2-benzothiazolylsulfenamide, trade name "Nocceler CZ-G", made by Ouchi Shinko Chemical Industrial Co., Ltd.
14 SBR-2: styrene-butadiene copolymer rubber, emulsion polymerization SBR, trade name "JSR 1502", made by JSR Corporation
15 Glycerin fatty acid ester D: synthesized according to the method of Production Example 1 of WO 2014/098155 A1 (PTL1), except that stearic acids (Lunac S-98, made by Kao Corporation) with the same molar amount are used as fatty acids instead of octanoic acids, glycerin fatty acid monoester content=61 mass %, and the constituent fatty acids contain 97 mass % of stearic acid, 2 mass % of palmitic acid, and 1 mass % of other fatty acids
16 Glycerin fatty acid ester E: synthesized according to the method of Production Example 1 of WO 2014/098155 A1 (PTL1), except that animal fax and oil derived hydrogenated fatty acids with the same molar amount are used as fatty acids instead of octanoic acids, glycerin fatty acid monoester content=56 mass %, and the constituent fatty acids contain 65 mass % of stearic acid, 28 mass % of palmitic acid, and 7 mass % of other fatty acids
17 Vulcanization accelerator TBBS: N-t-butyl-2-henzothiazolylsulfenamide, trade name "Nocceler NS", made by Ouchi Shinko Chemical Industrial Co., Ltd.

From Comparative Example 1 and Comparative Example 2 in Table 1, and Comparative Example 4 and Comparative Example 5 in Table 2, it is understood that by compounding the chemical as disclosed in WO 2014/098155 A1 (PTL1), it is possible to improve the processability, but impossible to sufficiently improve the breaking resistance and the low loss property. On the other hand, from Example 1 in Table 1, and Examples 2 to 4 in Table 2, it is understood that the rubber composition according to this disclosure is excellent in not only processability, but also breaking resistance and low loss property.

From Comparative Example 7 and Example 4 in Table 2, it is understood that as compared to the case of compounding an additive composition in which a fatty acid component which is the most among constituent fatty acids of the glycerin fatty acid ester is more than 90 mass % in all the fatty acids, if compounded is an additive composition in which a fatty acid component which is the most among constituent fatty acids of the glycerin fatty acid ester is 90 mass % or less in all the fatty acids, the processability, the breaking resistance and the low loss property of the rubber composition are improved.

INDUSTRIAL APPLICABILITY

The additive composition for silica compounded rubber composition of this disclosure can be used by being added into a silica compounded rubber composition, for improving the processability, the breaking resistance and the low loss property of the rubber composition. Moreover, the rubber composition of this disclosure may be applied to tires and other rubber products. Moreover, the tire of this disclosure may be used as tires for various vehicles.

The invention claimed is:
1. An additive composition for silica compounded rubber composition comprising a glycerin fatty acid ester, wherein:
the glycerin fatty acid ester is an ester of a glycerin and two or more fatty acids, a fatty acid component which is the most among the two or more fatty acids constituting the glycerin fatty acid ester being 10 to 90 mass % of all fatty acids;
the fatty acids constituting the glycerin fatty acid ester have 8 to 22 carbon atoms; and
a monoester component is contained in an amount of 85 to 98 mass % in the glycerin fatty acid ester.
2. The additive composition for silica compounded rubber composition according to claim 1, wherein:
among the two or more fatty acids constituting the glycerin fatty acid ester, one among the most fatty acid component and a second most fatty acid component is a fatty acid with 16 carbon atoms, and the other is a fatty acid with 18 carbon atoms.
3. The additive composition for silica compounded rubber composition according to claim 2, wherein:
a mass ratio of the fatty acid with 16 carbon atoms and the fatty acid with 18 carbon atoms is 90/10 to 10/90.
4. A rubber composition comprising a diene based rubber, a silica, and the additive composition for silica compounded rubber composition according to claim 1.
5. The rubber composition according to claim 4, wherein:
a mass ratio of the fatty acid with 16 carbon atoms and the fatty acid with 18 carbon atoms is 75/25 to 25/75.
6. The rubber composition according to claim 4, wherein:
a compounding amount of the additive composition for silica compounded rubber composition is 0.5 to 20 parts by mass per 100 parts by mass of the silica.
7. The rubber composition according to claim 4, wherein:
the silica is contained in an amount of 10 to 120 parts by mass per 100 parts by mass of the diene based rubber.
8. The rubber composition according to claim 4, wherein:
the diene based rubber contains a styrene-butadiene copolymer rubber.
9. A tire using the rubber composition according to claim 4.
10. A rubber composition comprising a diene based rubber, a silica, and the additive composition for silica compounded rubber composition according to claim 2.
11. A rubber composition comprising a diene based rubber, a silica, and the additive composition for silica compounded rubber composition according to claim 3.
12. A tire using the rubber composition according to claim 5.

13. A tire using the rubber composition according to claim 6.

14. A tire using the rubber composition according to claim 7.

15. A tire using the rubber composition according to claim 8.

* * * * *